Aug. 7, 1962 J. N. SALAPATAS 3,048,126
CONVEYOR INSTALLATION FOR WHEELED CARTS
Filed March 20, 1961 5 Sheets-Sheet 1

INVENTOR.
JAMES N. SALAPATAS
BY Ely, Frye & Hamilton
ATTORNEYS

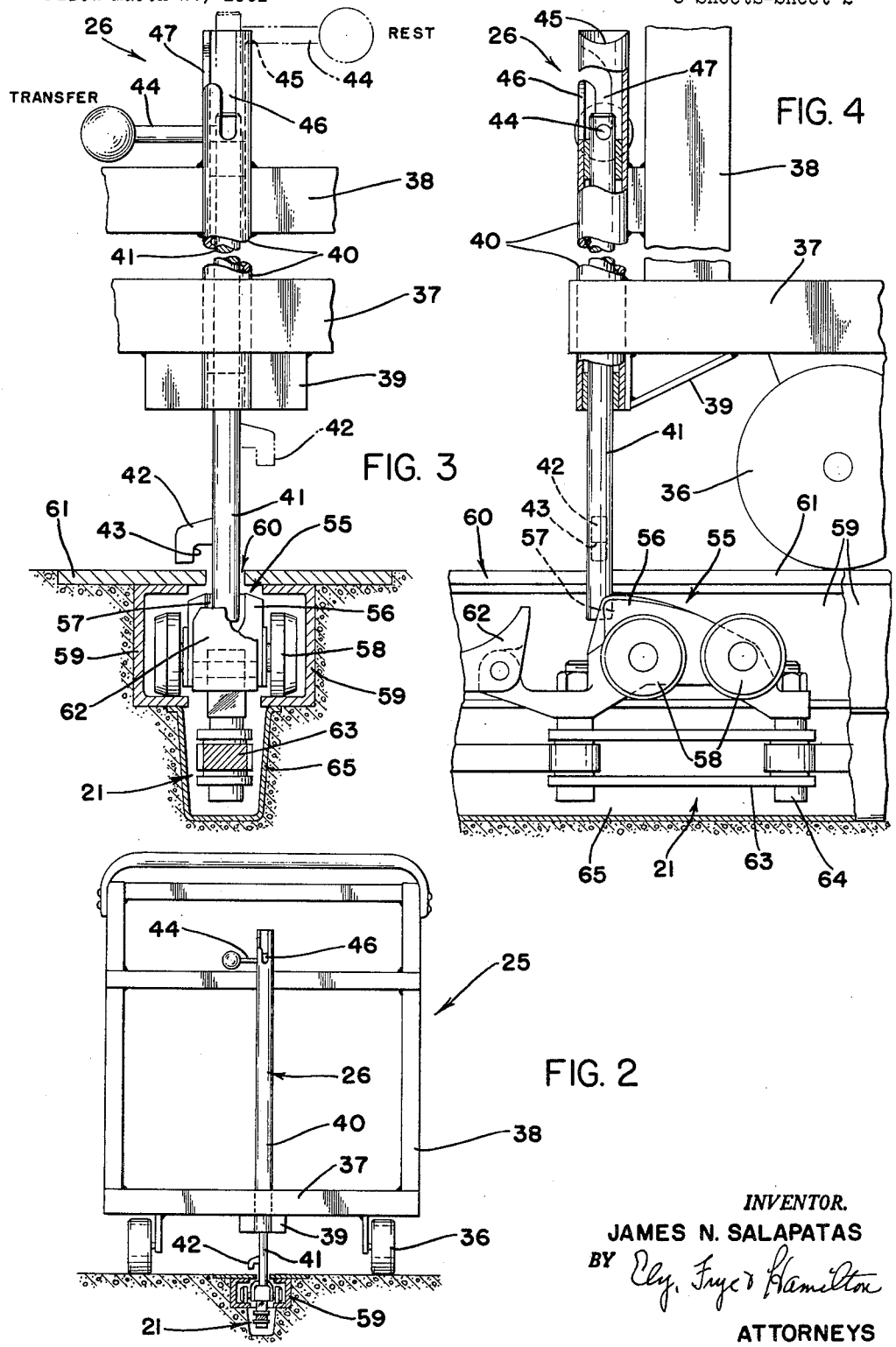

Aug. 7, 1962 J. N. SALAPATAS 3,048,126
CONVEYOR INSTALLATION FOR WHEELED CARTS
Filed March 20, 1961 5 Sheets-Sheet 3
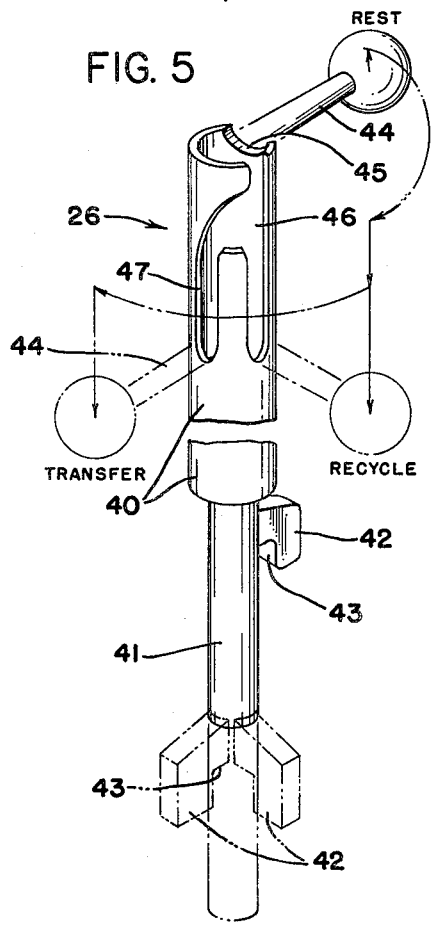
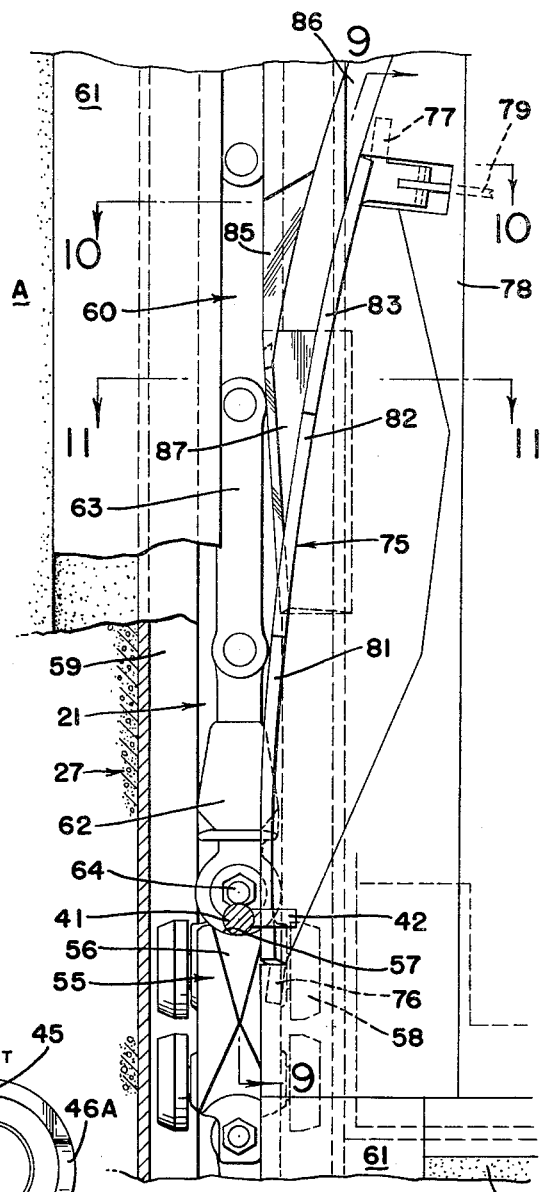
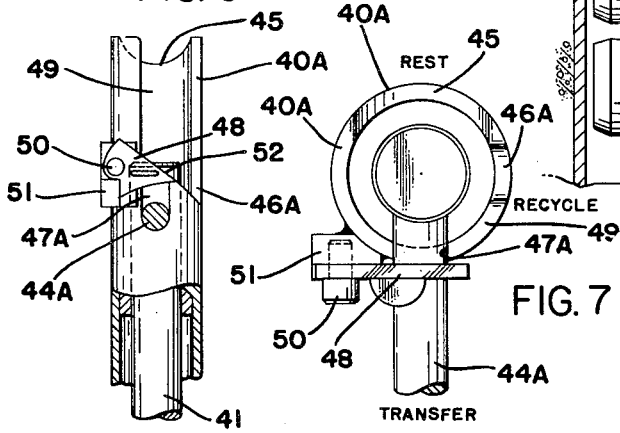
INVENTOR.
JAMES N. SALAPATAS
BY
ATTORNEYS Aug. 7, 1962 J. N. SALAPATAS 3,048,126
CONVEYOR INSTALLATION FOR WHEELED CARTS
Filed March 20, 1961 5 Sheets-Sheet 4
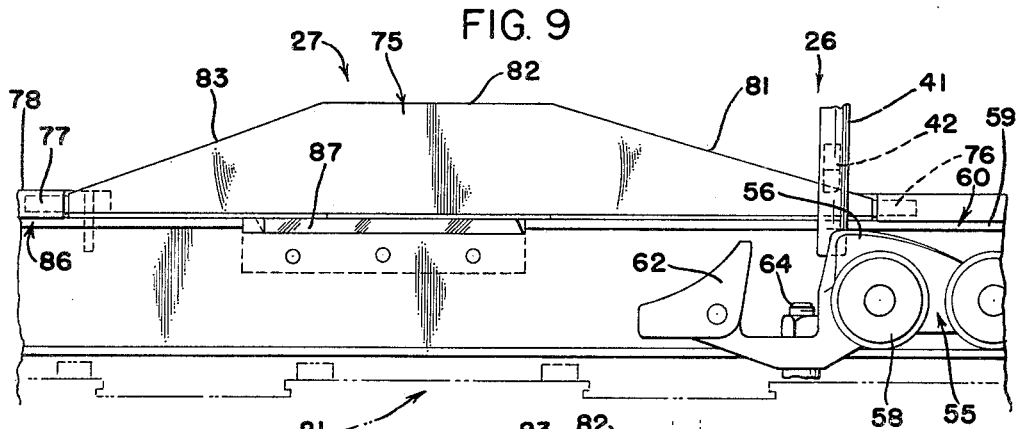
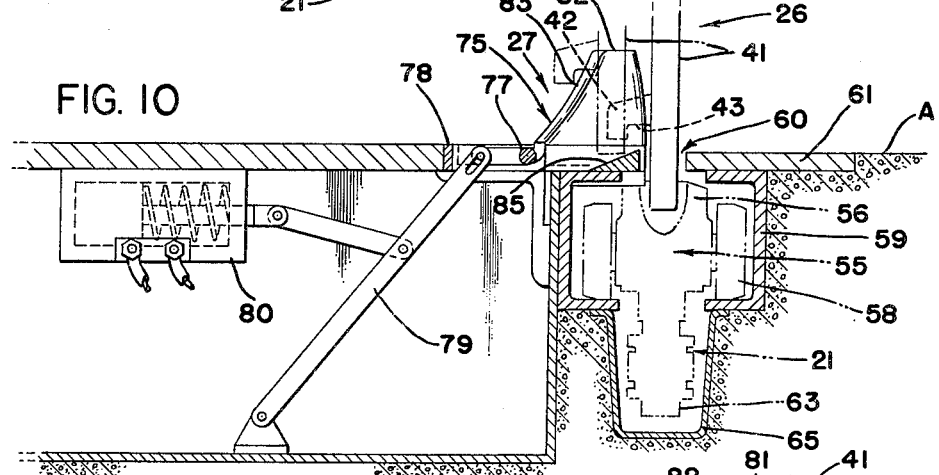
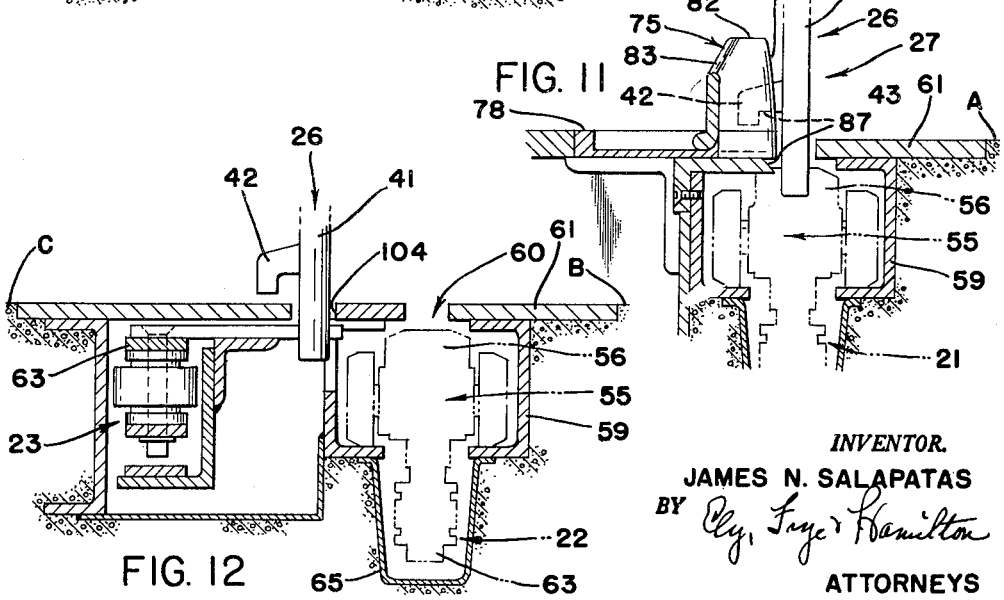
INVENTOR.
JAMES N. SALAPATAS
BY
ATTORNEYS Aug. 7, 1962 J. N. SALAPATAS 3,048,126
CONVEYOR INSTALLATION FOR WHEELED CARTS
Filed March 20, 1961 5 Sheets-Sheet 5
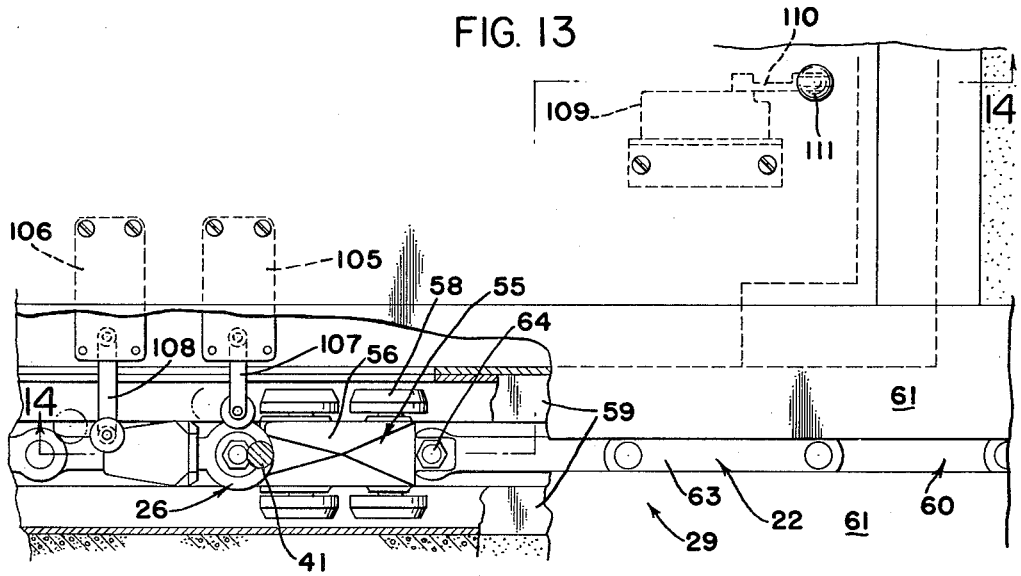
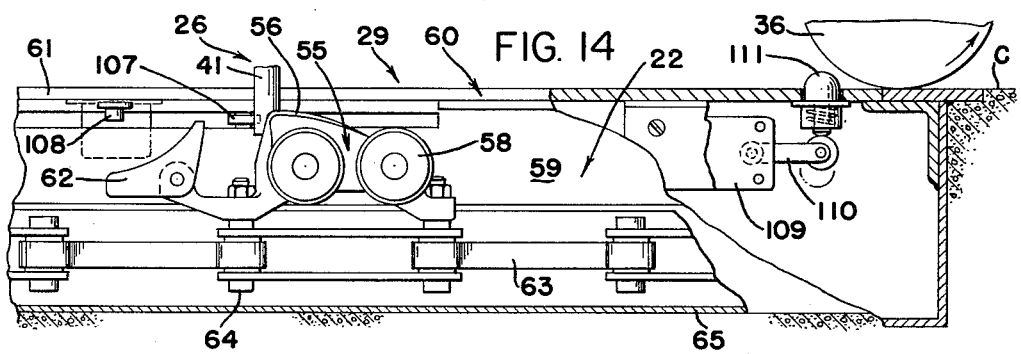
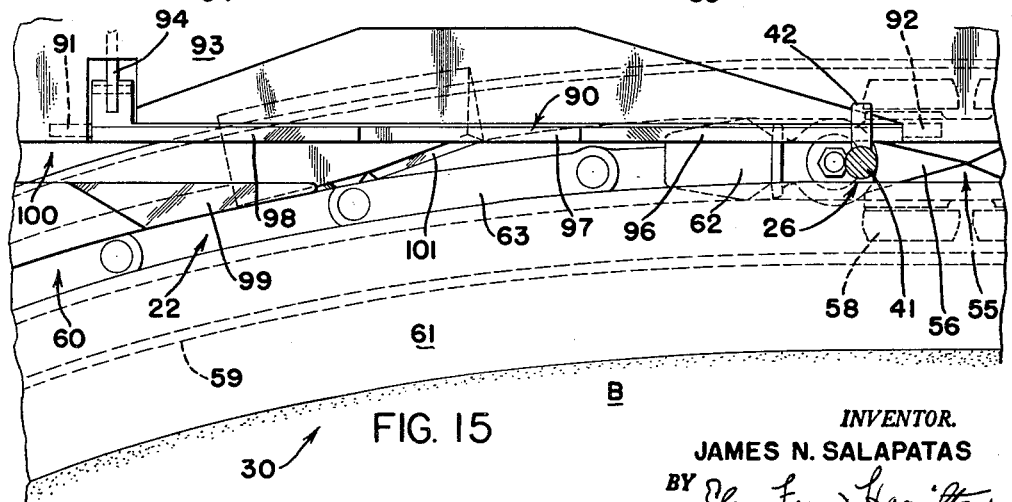
INVENTOR.
JAMES N. SALAPATAS
BY Ely, Frye & Hamilton
ATTORNEYS United States Patent Office 3,048,126
Patented Aug. 7, 1962

3,048,126
CONVEYOR INSTALLATION FOR
WHEELED CARTS
James N. Salapatas, Akron, Ohio, assignor to Consolidated Freightways Corporation of Delaware, Menlo Park, Calif., a corporation of Delaware
Filed Mar. 20, 1961, Ser. No. 97,023
16 Claims. (Cl. 104—178)

The present invention relates to material handling and transfer systems. More particularly, the invention relates to conveyor systems employing wheeled carts or trucks actuated by a floor located chain or drive means. Specifically, the invention relates to improved structure for automatic, programmed or controlled interchange of wheeled trucks or carrying carts between two or more independently operating conveyor systems, preferably of the floor located chain drive type.

The principal object of the present invention is to provide structure for the more efficient flow of bulk or prepackaged material from one area to another. In keeping with this general object, certain specific objects include the more efficient utilization of existing equipment and comparatively simple and readily available components, the improvement of means for the automatic, programmed or controlled interchange of trucks or carts between independently operating systems, to provide improved switch means for exchange of trucks or carts between the independently operating systems, and to provide improvement in truck or cart exchange selector mechanisms and constructions. These and further objects of the invention, as well as the several advantages and improved results attributable to the structure disclosed herein, will be apparent in view of the attached drawings and the detailed description which follows.

In the drawings:

FIG. 2 is an end view of a wheeled truck or carrying cart constructed according to the invention;

FIG. 3 is an enlarged detail view showing the exchange selector mechanism of a truck or cart constructed according to the invention;

FIG. 4 is a side elevation of the exchange selector mechanism of FIG. 3;

FIG. 5 is a fragmentary perspective view showing the three positions of an exchange selector mechanism according to the invention;

FIG. 6 is an elevation showing a modified form of cart exchange selector mechanism;

FIG. 7 is an enlarged top view of the exchange selector mechanism of FIG. 6;

FIG. 8 is a plan view of a transfer shunt or curved switch of a system installation according to the invention;

FIG. 9 is a side section taken substantially as indicated on line 9—9 of FIG. 8;

FIG. 10 is a cross section taken substantially as indicated on line 10—10 of FIG. 8;

FIG. 11 is another cross section taken substantially as indicated on line 11—11 of FIG. 8;

FIG. 12 is a cross section of an intersection or transfer location of a system installation according to the invention, taken substantially as indicated on line 12—12 of FIG. 1;

FIG. 13 is a plan view of a control means location for a system installation according to the invention;

FIG. 14 is a side section taken substantially as indicated on line 14—14 of FIG. 13; and FIG. 15 is a plan view of a transfer by-pass or straight switch of a system installation according to the invention.

*General Description*

Figure 1:
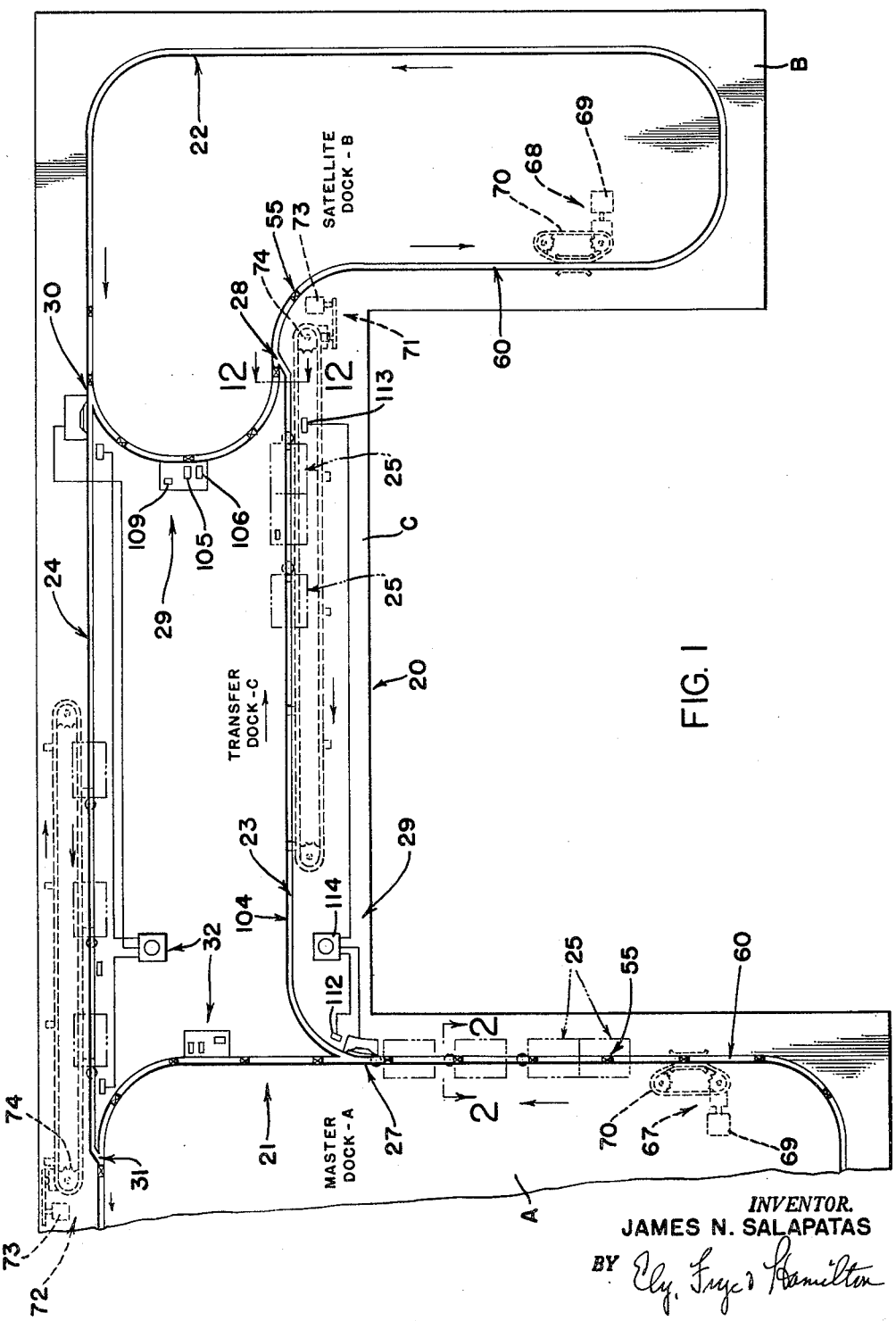
FIG. 1 is a schematic plan view, partially broken away on the left side, showing a representative conveyor system and installation according to the invention.

A conveyor installation or system according to the invention will be referred to generally by the numeral 20. The system 20 includes the following components, each being referred to generally by the numeral or letter indicated.

On the floor of the master dock A is an independently operating floor located drive means or conveyor system 21, preferably of the tow conveyor or chain type. On the floor of the satellite dock B is another independently operating conveyor system 22, having tow components compatible with conveyor 21. Between the docks A and B is a transfer bridge, structure or dock C. On the floor of dock C are two independently operating conveyor systems. A delivery conveyor section 23, providing a storage delivery area, is selectively operated from dock A toward dock B. A return conveyor section 24, providing a storage return area, is selectively operated from dock B toward dock A. The wheeled trucks or conveyor carts 25, which are preferably loaded on dock A and unloaded on dock B, are equipped with a tow chain engaging and exchange selector mechanism 26.

The carts 25 on dock A are shunted from conveyor system 21 onto conveyor section 23 by a normally-open transfer switch 27. Preferably, the carts 25 move from conveyor system 21 onto the leading portion of conveyor section 23 under the influence of inertial force and/or gravity. The carts 25 move from conveyor section 23 onto conveyor system 22 over a permanently-open intersection 28. As the loaded carts move along conveyor section 23 they slow down or stop until such time as a control means 29 permits their movement past intersection 28 onto conveyor system 22. The control means 29 includes elements detecting either the presence of recycling carts, or the absence of available tow components, on conveyor system 22. The control means 29 regulates energization of the drive means on the trailing portion of conveyor section 23 so that a loaded cart is transferred onto dock B only when space therefor is available on conveyor system 22. The control means 29 also may include elements detecting either the presence or absence of carts 25 on conveyor section 23. These elements of control means 29 will regulate closing of switch 27 if there is no space available for a loaded cart on conveyor section 23.

The unloaded carts 25 on dock B are by-passed from conveyor system 22 onto conveyor section 24 by a normally-open transfer switch 30. Preferably, the carts 25 move from conveyor system 22 onto the leading portion of conveyor section 24 under the influence of inertial force and/or gravity. The carts 25 move from conveyor section 24 onto conveyor system 21 over a permanently open intersection 31. As the carts move along conveyor section 24 they slow down or stop until such time as a control means 32 permits their movement past intersection 31 onto conveyor system 21. The control means 32 includes elements detecting either the presence of recycling carts, or the absence of available tow components, on conveyor system 21. The control means 32 regulates energization of the drive means on the trailing portion of conveyor section 24 so that an empty cart 25 is returned to dock A only when space therefor is available on conveyor system 21. The control means 32 also may include elements (described in detail below) detecting either the presence or absence of carts 25 on conveyor section 24. These elements of control means 32 will regulate closing of switch 30 if there is no space available for an empty cart on conveyor section 24.

The exchange selector mechanism 26 for each cart 25 has three positions: "transfer"; "recycle"; and "rest." A fully loaded cart on dock A or an empty cart on dock B is "set," by a human operator, with the mechanism 26 in the "transfer" position. A partially loaded cart on dock A or a partially unloaded cart on dock B is preferably set with the mechanism 26 in the "recycle" position. When a cart 25 is disengaged and taken away from system 21 or system 22 for whatever reason, the mechanism 26 is set in the "rest" position.

Referring to FIGS. 2, 3 and 4, a cart 25 has undercarriage wheels 36, a load carrying platform 37 and front and rear vertical end frames 38. Attached to the front frame 38, medially of the wheels 36, each cart has a bracket 39 for securely mounting a tubular outer sleeve 40 of the exchange selector mechanism 26. The fixed sleeve 40 slidably carries a tow rod 41. Near its lower end, a rod 41 carries a strong, projecting hook 42, the overhang of which defines a slot 43 for engagement with the guide plate of a switch means, 27 or 30, as described in detail below. The hook 42 is located upwardly from the end of rod 41 a distance sufficient to clear the floor level of the dock when the end of rod 41 is engaged by a tow component of the conveyor drive means also described in detail below.

As best shown in FIG. 5, the upper end of the tow rod 41 has a laterally projecting handle 44 for selective manual setting of the mechanism 26 in the transfer, recycle or rest position. It will be noted that preferably, the projecting handle 44 is aligned vertically with the projecting hook 42.

On the upper edge of sleeve 40 is a shallow half slot 45 adapted to engage the handle 44 and set the tow rod 41 and hook 42 in the highest or rest position. To one side of slot 45 is long slot 46 extending longitudinally of sleeve 40. The slot 46 is intended to engage the handle 44 and set the tow rod 41 and hook 42 in the low and recycle position. In this position, the lower end of the tow rod can be engaged by a tow component of the conveyor chain. However, the location of slot 46 is chosen so that the hook 42 will extend longitudinally in the direction of cart movement and so cannot engage the guide plate of a switch 27 or 30 (described below).

The tow rod 41 and hook 42 are set in the low and transfer position when the handle 44 is engaged by a slot 47. In this position, the lower end of the tow rod can be engaged by a tow component of the conveyor and the hook 42 will extend transversely of the direction of cart movement and so can engage the guide plate of a switch, 27 or 30 (described below). Thus, the slot 47 is preferably opposite to slot 45 and at right angles to (or separated by 90° from) slot 46. To ensure positive engagement of the tow rod 41 with a tow component of the conveyor chain, slots 46 and 47 share a common entrance with slot 47 having a downwardly curved upper guiding portion. It will further be noted that direct entrance of handle 44 is into the slot 46. Thus, if the operator is inadvertent in setting the mechanism 26, the cart 25 will preferentially recycle on either conveyor system 21 or system 22, rather than be set for transfer from one system to the other.

Referring to FIGS. 6 and 7, the desired result of requiring an intentional or positive setting of the mechanism 26 in the "transfer" position, could also be achieved by use of a pivoted latch 48 normally closing slot 47A and diverting the handle 44A into slot 46A. As shown, the upper entrance 49 into slots 46A and 47A is relatively wide. The latch 48 is attached by a pivot pin 50 extending into a small boss 51 on sleeve 40A. The upper surface 52 of the latch 48 is inclined toward slot 46A. To locate the handle 44A in slot 47A it is necessary to first manually raise the latch and clear the entrance into slot 46A.

The floor located drive means which are actuated to move the carts along the several conveyors 21, 22, 23 and 24 may be of any of several well known commercially available constructions. In general, for practice of the invention each conveyor drive means should have regularly spaced tow components moving beneath the floor level adapted to engage the lower end of a tow rod 41 projecting through a guide slot in the floor.

As best shown in FIGS. 2 and 3, a suitable conveyor tow component or pusher trolley 55 has an upwardly humped "dog" or body portion 56 with a forward facing socket 57 for engagement with the lower end of a cart tow rod 41. The body portion 56 has rotating wheels 58, preferably two wheels on each side, confiningly engaged within opposed "C" channels 59 embedded below floor level. Immediately above the channel 59 is a continuous slot 60, for insertion of the tow rod 41, defined by spaced apart and parallel floor plates 61. It is preferred that each pusher dog 55 carry a rearwardly pivoted latch 62 to prevent unintentional disengagement of the cart tow rod 41, in the event the conveyor is stopped, for any reason.

The tow components 55 are driven by a continuous chain 63 to which they are suitably attached as by bolts 64. Each chain 63 is enclosed within a chain container 65 attached to the underside of the channels 59. The drive means 67 and 68 for the master and satellite conveyors 21 and 22 (as shown by dotted lines in FIG. 1), include an electric motor and reduction unit 69 powering a sprocket and track caterpillar unit 70 suitably engaged with the respective chains 63. The drive means 71 and 72 for the trailing portions of the delivery and return conveyors 23 and 24 (also shown by dotted lines in FIG. 1) each include an electric motor and reduction unit 73 powering a suitable sprocket and track unit 74 suitably engaged with the respective chains 63.

A transfer switch 27 for shunting carts 25, with the exchange selector mechanism 26 positively set in the transfer position from the master conveyor system 21 onto the delivery conveyor system 23 is best shown in FIGS. 8–11. At the switch location, one of the conventional floor plates 61 is replaced by a switch assembly including a curved guide plate 75. At either end, the switch guide plate 75 is provided with pivot pins 76 and 77 rotatably journaled in a switch floor plate 78. The rear pivot pin 77 is provided with an operating linkage 79 actuated by a remotely controlled solenoid 80. The linkage 79 and solenoid 80 (preferably located below floor level in a suitable foundation pit for the entire switch assembly) are so constructed and arranged that the guide plate 75 is normally in the raised or switch "open" position. As further described below, the solenoid 80 may be energized by elements of control means 29 to lower the guide plate 75 to the switch "close" position in the absence of available space for a cart 25 on the delivery conveyor section 23.

The transfer function of the switch guide plate 75 is performed by engagement of a specially contoured upper surface with the projecting hook 42 of a cart exchange selector mechanism 26 set in the transfer position. When the switch 27 is open, the hook 42 will slidingly engage the specially contoured upper surfaces of a guide plate 75.

As best shown in FIG. 9, the leading surface 81 of a guide plate 75 begins, adjacent pivot pin 76, at floor level. The leading surface 81 is upwardly inclined at an angle intended to raise and disengage the tow rod 41 from socket 57 of the pusher dog 55. At the upper end of surface 81 is a medial surface 82 which maintains the tow rod 41 in the raised position and guides the cart 25 during the turning movement from the conveyor 21 onto the beginning of conveyor 23. At the rear end of surface 82, the trailing surface 83 is downwardly inclined at an angle intended to lower the tow rod 41, to a position of ready for engagement with a tow component on the delivery conveyor section 23. Referring to the detailed description above of the cart exchange selector mechanisms 26, it will be noted that when the tow rod 41 is permitted to lower by the declination of surface 83, the handle 44 of the mechanism 26 will be in the recycle slot 46 or 46A, rather than in the transfer slot 47 or 47A. Thus, the mechanism 26 for each cart 25 passing over transfer switch 27 will be set to preferentially continue or recycle on the conveyor system 22 rather than enter the conoveyor section 24 over the by-pass switch 30.

Referring to FIG. 8, further details of the transfer switch 27 include the provision of an inclined cam surface 85, located in the apex defined by divergence of the switch slot 86 from the conveyor slot 60. In this area, the surface 85 is inclined downwardly away from slot 60 and toward slot 86 to ensure that the lowering tow rod 41 will not accidentally become reinserted into slot 60. In this same respect, a check plate 87 may, if desired, be inserted parallel to slot 60 and at the beginning of slot 86. The check plate 87 is elevated slightly above the upper level of the body portion 56 of a tow component 55 to insure that the tow rod 41 of a cart 25, not intended for transfer onto conveyor section 23, will not accidentally be directed into slot 86.

A transfer switch 30 for bypassing carts 25, with the exchange selector mechanism 26 positively set in the transfer position, from the satellite conveyor system 22 onto the return conveyor section 24 is shown in FIG. 15. The switch guide plate 90 is straight, having pivot pins 91 and 92 at either end rotatably journaled in a floor plate 93. The front pivot pin 91 has an operating linkage 94 actuated by a remotely controlled operating solenoid (not shown). The linkage 94 and operating solenoid are so constructed and arranged that the guide plate 90 is normally in the raised or switch "open" position. As further described below, the operating solenoid may be energized by elements of control means 32 to lower the guide plate 90 to the switch "close" position in the absence of available space for a cart 25 on the return conveyor section 24.

The guide plate 90 has three specially contoured upper surfaces similar to surfaces 81, 82 and 83 of a shunt switch guide plate 75. The leading surface 96 is engaged by a hook 42 to raise the tow rod 41 from engagement with a pusher dog 55. The medial surface 97 maintains the tow rod 41 in the raised position and guides the cart 25 during the divergent movement from the conveyor 22 onto the beginning of conveyor 24. The trailing surface 98 lowers the tow rod 41, reset to the recycle position.

The switch 30 is also provided with an inclined cam surface 99, located in the apex defined by the juncture of the switch slot 100 with the conveyor slot 60. Surface 99 functions in the same manner as surface 85 of switch 27. Also, switch 30 may include a check plate 101 located in the same position as check plate 87 of switch 27.

Referring to FIG. 12, the intersection 28 is of conventional construction and provides for the convergence of a delivery conveyor slot 104 with a satellite conveyor slot 60. The respective operating chains 63 and tow components 55 are brought as close together as space limitations will permit. The intersection 31 between the return conveyor 24 and the master conveyor 21, is preferably of similar construction to the intersection 28 as shown in FIG. 12.

As indicated above, the leading portions of conveyor sections 23 and 24, immediately following switches 27 and 30 are non-driven and the carts move thereon solely under the influence of inertial force or gravity. Where space and other engineering requirements permit, this feature is preferred because of reduced costs for the drive components of the trailing portions of conveyor sections 23 and 24 and because storage of the carts 25 is best controlled by their stopping on the respective transfer conveyors and regulated transfer onto the master and satellite conveyors.

The control means 29 include electrical switch elements located adjacent the satellite conveyor system 22 between the by-pass switch 30 and intersection 28. Referring to FIG. 13, mounted in the floor are two conventional electrical limit switches 105 and 106. The lever arm and cam 107 of the leading switch 105 is positioned for engagement only by a corner of the body portion 56 of a tow component 55. The lever arm and cam 108 of the trailing switch 106 is positioned for engagement only by a tow rod 41 inserted in socket 57 of a tow component 55. The switches 105 and 106 are connected through a suitable delay circuit to the motor 73 of the drive means 71 for conveyor section 23. When lever arm 107 is actuated, the drive means 71 will be actuated to transfer a loaded cart 25 from conveyor section 23 past intersection 28 and onto conveyor 22, unless and within a predetermined time interval the lever arm 108 is actuated. The time interval selected for this function of cancellation of the signal from switch 105 by actuation of switch 106 is determined by the rate of conveyor chain 63 movement, the spacing between the tow components 55, and the distance between switches 105 and 106 and intersection 28. In any event, the conveyor 23 will not be actuated if a free tow component 55 is not immediately available to engage the tow rod 41 of a cart 35.

If the conveyor installation is being operated with one or more double or tandem carts intermingled with single carts 25, or if the spacing between tow components 55 is less than the overall length of each cart unit, the condition will occasionally arise where an otherwise free tow component 55 is beneath the second or trailing cart. In this event, the control means 29 preferably includes a third electrical limit switch 109. The lever arms and cam 110 of switch 109 are actuated by a floor button 111 located to be engaged by a wheel on a trailing cart. If switch 109 is actuated within a predetermined time interval, a signal from actuation of switch 105 will be cancelled and conveyor 23 will not be actuated to transfer a loaded cart 25 onto conveyor 22.

The control means 29 also may include electrical elements located adjacent the delivery conveyor section 23 between the transfer switch 27 and intersection 28. Referring to FIG. 1, a conventional electrical limit switch 112 is actuated in any suitable manner by transfer of a loaded cart onto conveyor section 23. A second limit switch 113 is actuated by the movement of a cart from conveyor section 23 onto conveyor 22. The signals from switches 112 and 113 are totalized in a suitable digital counter 114. When the total number of carts 25 fill all the available space on conveyor section 23, the counter 114 will actuate solenoid 80 to close switch 27 until such time as space for a cart is available.

The control means 32 preferably include elements corresponding to switches 105, 106 and 109, for regulation of the drive means 72 for conveyor section 24, and switches 112, 113 and counter 114, for regulation of the switch 30.

The above description illustrates a typical conveyor installation according to the concepts of the invention. However, the principles of the invention may be applied in varied forms without departing from the spirit thereof. Therefore, the true scope of the present invention should be determined solely by the appended claims.

What is claimed is:

1. A conveyor installation for wheeled carts actuated by floor located drive means, comprising, an independently operating master drive means, an independently operating satellite drive means, an intermittently operating delivery drive means between said master and satellite drive means, a normally-open switch means for shunting carts from said master drive means onto said delivery drive means, a permanently open first intersection between said delivery drive means and said satellite drive means, an intermittently operating return drive means between said satellite and master drive means, a normally-open switch means for bypassing carts from said satellite drive means onto said return drive means, and a permanently open second intersection between said return drive means and said master drive means.

2. A conveyor installation according to claim 1 in which control means actuated by the presence of carts on said satellite drive means regulate movement of carts on said delivery drive means past said first intersection.

3. A conveyor installation according to claim 1 in which control means actuated by the presence of carts on said master drive means regulate movement of carts on said return drive means past said second intersection.

4. A conveyor installation according to claim 2 in which additional control means regulate closing of said shunt switch means in the absence of available space for a cart on said delivery drive means.

5. A conveyor installation according to claim 3 in which additional control means regulate closing of said bypass switch means in the absence of available space for a cart on said return drive means.

6. A conveyor installation for wheeled carts actuated by floor located drive means, comprising, an independently operating master drive means, an independently operating satellite drive means, an intermittently operating delivery drive means between said master and satellite drive means, a normally-open switch means for shunting carts from said master drive means onto said delivery drive means, a permanently open first intersection between said delivery drive means and said satellite drive means, an intermittently operating return drive means between said satellite and master drive means, a normally-open switch means for bypassing carts from said satellite drive means onto said return drive means, a permanently open second intersection between said return drive means and said master drive means, and an exchange selector mechanism on each cart actuated by passage of a cart over said shunt switch means whereby said cart will preferentially continue on said satellite drive means past said bypass switch means.

7. A conveyor installation for wheeled carts actuated by floor located drive means, comprising, an independently operating master drive means, an independently operating satellite drive means, an intermittently operating delivery drive means between said master and satellite drive means, a normally-open switch means for shunting carts from said master drive means onto said delivery drive means, a permanently open first intersection between said delivery drive means and said satellite drive means, an intermittently operating return drive means between said satellite and master drive means, a normally-open switch means for bypassing carts from said satellite drive means onto said return drive means, a permanently open second intersection between said return drive means and said master drive means, and an exchange selector mechanism on each cart actuated by passage of a cart over said bypass switch means whereby said cart will preferentially continue on said master drive means past said shunt switch means.

8. A system for transferring wheeled carts between a master dock conveyor and a satellite dock conveyor, each of said conveyors having an independently operating drive, comprising, a storage delivery area for said carts between said conveyors, a storage return area between said conveyors, each of said areas having an intermittently operating drive, switch means connecting said master conveyor to said delivery area and said satellite conveyor to said return area, permanently open intersections between said delivery area and said satellite conveyor and said return area and said master conveyor, and control means for each of said area drive means actuated by the presence of carts on each of said conveyors to regulate movement of carts in said areas past each of said intersections.

9. A system for transferring wheeled carts between a master dock conveyor and a satellite dock conveyor, each of said conveyors having an independently operating drive, comprising, a storage delivery area for said carts between said conveyors, a storage return area between said conveyors, each of said areas having an intermittently operating drive, switch means connecting said master conveyor to said delivery area and said satellite conveyor to said return area, permanently open intersections between said delivery area and said satellite conveyor and said return area and said master conveyor, and control means located between each of said switch means and the nearest of said intersections to regulate movement of carts in said delivery and return areas past each of said intersections.

10. A system for transferring wheeled carts between a master dock conveyor and a satellite dock conveyor, each of said conveyors having an independently operating drive, comprising, a storage delivery area for said carts between said conveyors, a storage return area between said conveyors, each of said areas having an intermittently operating drive, switch means connecting said master conveyor to said delivery area and said satellite conveyor to said return area, permanently open intersections between said delivery area and said satellite conveyor and said return area and said master conveyor, and control means for each of said switch means actuated by the presence of carts on each of said areas to regulate movement of carts into said areas over said switch means.

11. A system for transferring wheeled carts between a master dock conveyor and a satellite dock conveyor, each of said conveyors having an independently operating drive, comprising, a storage delivery area for said carts between said conveyors, a storage return area between said conveyors, each of said areas having an intermittently operating drive, switch means connecting said master conveyor to said delivery area and said satellite conveyor to said return area, permanently open intersections between said delivery area and said satellite conveyor and said return area and said master conveyor, and control means located between each of said switch means and the farthest of said intersections to regulate movement of carts on said conveyors over each of said switch means.

12. In combination with a wheeled cart for use with a floor located drive means having spaced tow components, a vertically movable tow rod having a lower end adapted for contact with a tow component and a handle projecting laterally of the upper end, a sleeve attached to one end of said cart slidably confining said tow rod and having three spaced apart longitudinal slots each adapted to engage the handle of said tow rod, one of said slots having a length such that when engaged with said handle the lower end of said tow rod will be raised above the floor, the other two of said slots each having a length such that when engaged with said handle the lower end of said tow rod will be in position for contact with a tow component.

13. In combination with a wheeled cart for use with a floor located drive means having spaced tow components, a vertically movable tow rod having a lower end adapted for contact with a tow component and a handle projecting laterally of the upper end, a sleeve attached to one end of said cart slidably confining said tow rod and having three spaced apart longitudinal slots each adapted to engage the handle of said tow rod, the first of said slots having a length such that when engaged with said handle the lower end of said tow rod will be raised above the floor, the second and third of said slots each having a length such that when engaged by said handle the lower end of said tow rod will be in position for contact with said component, said third slot being spaced on said sleeve opposite of said first slot, said sleeve further having means to preferentially direct said handle, when above said second and third slots, into said second slot.

14. A switch for transferring wheeled carts from a conveyor installation actuated by floor located drive means, said cart having a vertically movable tow rod with a projecting hook adjacent the lower end thereof, comprising, a floor plate, a guide plate rotatably mounted at either end in said floor plate, the upper surface of said guide plate being contoured so as to engage said hook and raise said tow rod, and linkage means on said floor plate to selectively rotate said guide plate to open and close said switch.

15. An exchange selector mechanism for a wheeled cart actuated by floor located drive means having spaced tow components and including switch means which in the open or exchange position have a vertically raised guide plate, comprising, a vertically movable tow rod, the lower end of which is adapted for contact with a tow component and the upper end of which has a laterally projecting handle, a hook projecting laterally from said tow rod above the lower end thereof and vertically aligned with said handle, a sleeve attached to one end of said cart slidably confining said tow rod, and means on said sleeve for selectively positioning said handle and said hook in predetermined relation to said switch guide plate.

16. A system for transferring wheeled carts between a master dock conveyor and a satellite dock conveyor, each of said conveyors having an independently operating drive, comprising, a storage delivery area for said carts between said conveyors, a storage return area between said conveyors, each of said areas having an intermittently operating drive, switch means connecting said master conveyor to said delivery area and said satellite conveyor to said return area, permanently open intersections from said delivery area to said satellite conveyor and from said return area to said master conveyor, control means for each of said switch means actuated by the presence of carts on each of said areas to regulate movement of carts into said areas over said switch means, and additional control means for each of said area drive means actuated by the presence of carts on each of said conveyors to regulate movement of carts in said areas past each of said intersections.

References Cited in the file of this patent
UNITED STATES PATENTS

| | | |
|---|---|---|
| 2,816,516 | Diehl | Dec. 17, 1957 |
| 2,868,138 | Bishop et al. | July 13, 1959 |
| 2,936,719 | Rodd | May 17, 1960 |
| 2,949,862 | Klamp | Aug. 23, 1960 |
| 2,965,043 | Klamp et al. | Dec. 20, 1960 |
| 2,982,227 | Bishop et al. | May 2, 1961 |
| 2,982,228 | Bishop et al. | May 2, 1961 |